United States Patent
Carlesimo et al.

(10) Patent No.: US 9,950,695 B2
(45) Date of Patent: Apr. 24, 2018

(54) VEHICLE REAR WIPER AND WASHER ACTIVATION

(71) Applicant: GM GLOBAL TECHNOLOGY OPERATIONS LLC, Detroit, MI (US)

(72) Inventors: Daniel P. Carlesimo, Mcomb Township, MI (US); Marcelo V. Lazarini, Mcomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/188,781

(22) Filed: Jun. 21, 2016

(65) Prior Publication Data

US 2017/0361811 A1   Dec. 21, 2017

(51) Int. Cl.
*B60S 1/48* (2006.01)
*B60S 1/08* (2006.01)
*B60S 1/58* (2006.01)

(52) U.S. Cl.
CPC .............. *B60S 1/482* (2013.01); *B60S 1/0811* (2013.01); *B60S 1/583* (2013.01)

(58) Field of Classification Search
CPC .......... B60S 1/0811; B60S 1/46; B60S 1/482; B60S 1/483; B60S 1/485; B60S 1/486; B60S 1/583
See application file for complete search history.

(56) References Cited

U.S. PATENT DOCUMENTS

| | | | | |
|---|---|---|---|---|
| 3,594,846 A | * | 7/1971 | Kimura | B60S 1/482 15/250.02 |
| 4,336,482 A | * | 6/1982 | Goertler | B60S 1/0814 15/250.12 |
| 4,448,276 A | * | 5/1984 | Nakamoto | B60K 37/06 180/90 |

(Continued)

FOREIGN PATENT DOCUMENTS

| | | | | |
|---|---|---|---|---|
| DE | 4241056 A1 | * | 6/1994 | ............. B60S 1/482 |
| DE | 10340495 A1 | * | 3/2005 | ............. B60S 1/481 |

(Continued)

OTHER PUBLICATIONS

Opel Astra Owner's Manual 2013, Copyright by Adam Opel AG, Jul. 2012, KTA-2584/18-en, 263 pages.*

(Continued)

*Primary Examiner* — Behrang Badii
*Assistant Examiner* — David A Testardi
(74) *Attorney, Agent, or Firm* — Lorenz & Kopf, LLP

(57) ABSTRACT

Methods, systems, and vehicles are provided for controlling rear wiper units and rear washer units for a rear windshield of a vehicle. In accordance with one embodiment, the vehicle includes, in addition to the rear windshield, the rear washer unit, and the rear windshield, a control system. The control system includes a detection unit and a processor. The detection unit is coupled to a single input device onboard the vehicle. The detection unit is configured to detect a user's engagement of the single input device. The processor is (Continued)

coupled to the detection unit. The processor is configured to at least facilitate automatically controlling the rear wiper unit and the rear washer unit based on the detecting of the user's engagement of the single input device.

19 Claims, 3 Drawing Sheets

(56) References Cited

U.S. PATENT DOCUMENTS

| | | | | |
|---|---|---|---|---|
| 6,028,408 | A * | 2/2000 | Grass | B60S 1/08 |
| | | | | 318/443 |
| 7,615,955 | B2 * | 11/2009 | Harita | B60S 1/481 |
| | | | | 15/250.02 |
| 2012/0117745 | A1 * | 5/2012 | Hattori | B60S 1/0848 |
| | | | | 15/250.01 |
| 2013/0037627 | A1 * | 2/2013 | Kikuta | B60S 1/485 |
| | | | | 239/284.1 |
| 2015/0030462 | A1 * | 1/2015 | Boekenkamp | B60S 1/486 |
| | | | | 417/14 |
| 2016/0016536 | A1 | 1/2016 | Merwald et al. | |

FOREIGN PATENT DOCUMENTS

| | | | | | |
|---|---|---|---|---|---|
| DE | 102009033863 | A1 | * | 2/2010 | B60S 1/08 |
| GB | 2052799 | A | * | 1/1981 | B60S 1/482 |
| GB | 2287230 | A | * | 9/1995 | B60Q 1/0082 |
| GB | 2287231 | A | * | 9/1995 | B60Q 1/0082 |
| JP | 59106349 | A | * | 6/1984 | B60S 1/482 |
| JP | 04133843 | A | * | 5/1992 | B60S 1/3411 |

OTHER PUBLICATIONS

Opel Blazer Operation, Safety, Maintenance Manual, printed 2004, 109 pages, available on the Internet at http://chevy.pbworks.com/f/Blazer_Manual.pdf.*

Opel Blazer Manual date supporting documents (creation date Jun. 2, 2004, Internet Archive date Jun. 11, 2014), 2 pages.*

DPMA, German Office Action issued in German Application No. 102017113322A, dated Feb. 8, 2018.

* cited by examiner

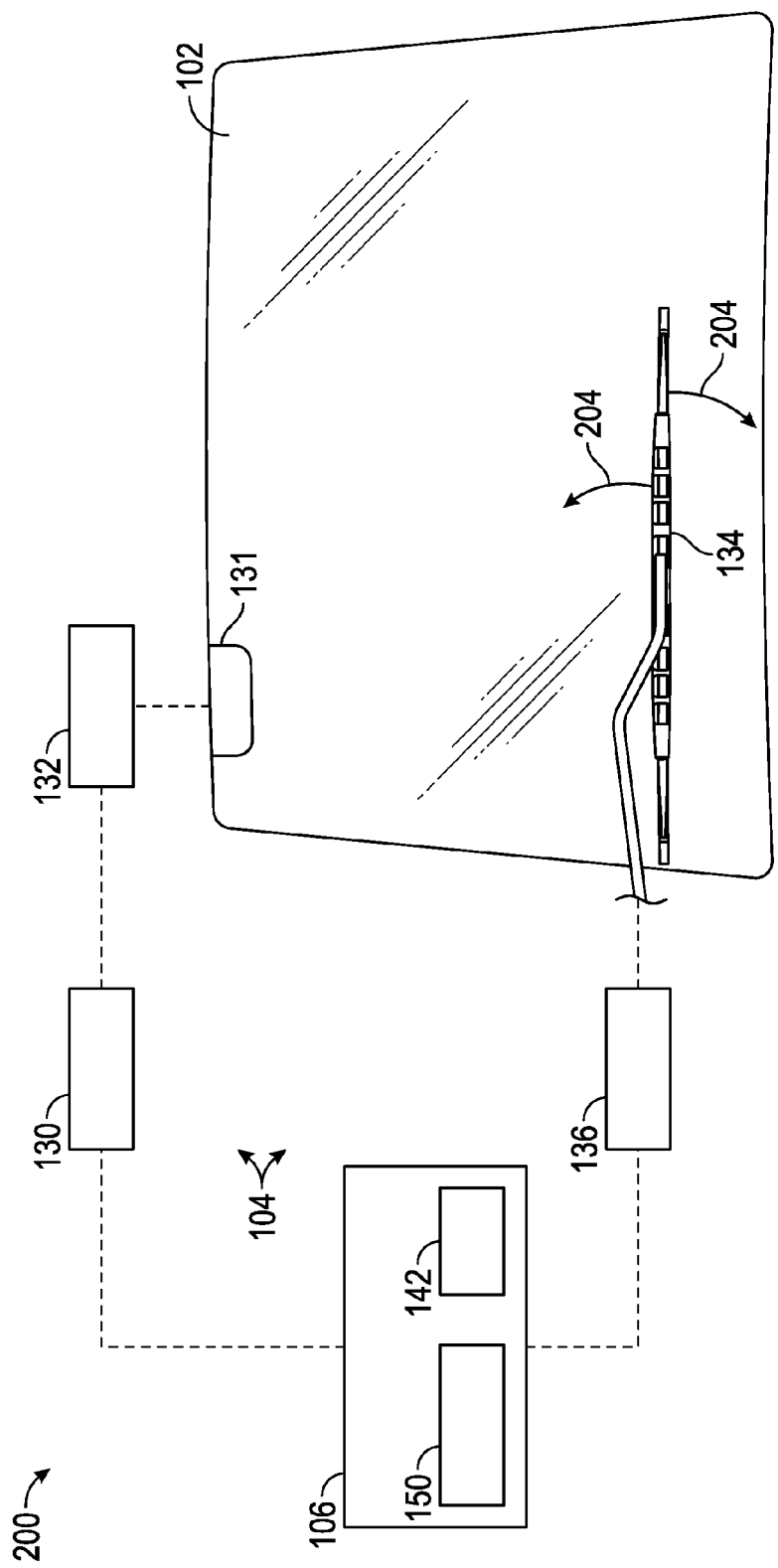
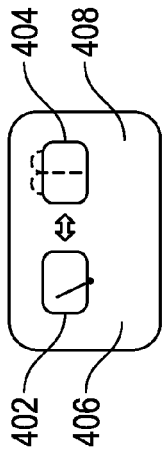
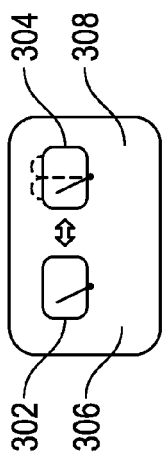

VEHICLE REAR WIPER AND WASHER ACTIVATION

TECHNICAL FIELD

The present disclosure generally relates to vehicles, and more particularly relates to methods and systems pertaining to wiper and washer assemblies for vehicles.

BACKGROUND

Today's vehicles often include wipers and washers for windshields of the vehicles. However, in certain situations, existing wiper and washer controls may not always be ideal with respect to wiper and washer functionality in certain situations, for example pertaining to rear windshields.

Accordingly, it is desirable to provide techniques for improved operation of vehicle rear wiper and washer systems. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises detecting, via a detection unit disposed onboard a vehicle having a rear windshield, a user's engagement of a single input device onboard the vehicle; and automatically controlling a rear wiper unit for the rear windshield and a rear washer unit for the rear windshield based on the detecting of the user's engagement of the single input device.

In accordance with another exemplary embodiment, a system is provided. The system comprises a detection unit and a processor. The detection unit is coupled to a single input device onboard a vehicle having a rear windshield, a rear washer unit for the rear windshield, and a rear wiper unit for the rear windshield. The detection unit is configured to detect a user's engagement of the single input device. The processor is coupled to the detection unit. The processor is configured to at least facilitate automatically controlling the rear wiper unit and the rear washer unit based on the detecting of the user's engagement of the single input device.

In accordance with a further exemplary embodiment, a vehicle is provided. The vehicle comprises a rear windshield, a rear washer unit for the rear windshield, a rear wiper unit for the rear windshield, and a control system. The control system comprises a detection unit and a processor. The detection unit is coupled to a single input device onboard the vehicle. The detection unit is configured to detect a user's engagement of the single input device. The processor is coupled to the detection unit. The processor is configured to at least facilitate automatically controlling the rear wiper unit and the rear washer unit based on the detecting of the user's engagement of the single input device.

DESCRIPTION OF THE DRAWINGS

The present disclosure will hereinafter be described in conjunction with the following drawing figures, wherein like numerals denote like elements, and wherein:

FIG. 2 is an illustration of the rear windshield, the rear windshield washer unit, the rear windshield wiper unit, and the control system of FIG. 1, in accordance with an exemplary embodiment;

FIGS. 3 and 4 are illustrations of a user interface of the control system of FIG. 1, and that is configured for use in simultaneously controlling the rear windshield washer unit and the rear windshield wiper unit of FIGS. 1 and 2, in accordance with different exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
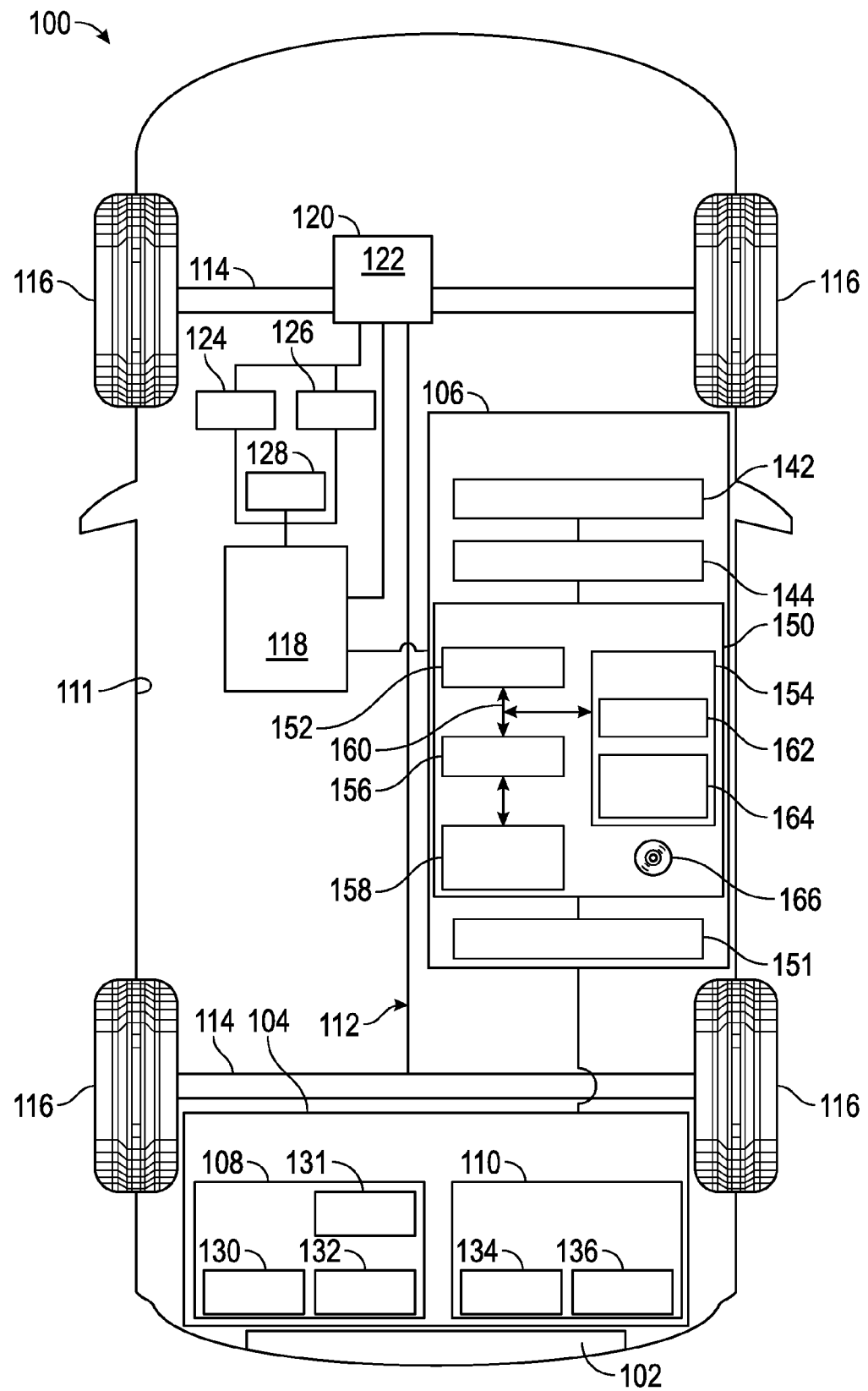
FIG. 1 is a functional block diagram of a vehicle that includes a rear windshield, a rear windshield washer unit, a rear windshield wiper unit, and a control system for controlling the rear washer and wiper units, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As described in greater detail further below, the vehicle 100 includes a rear windshield 102, a wiper/washer system 104 for the rear windshield 102, and a control system 106 for the wiper/washer system 104. Also as described below, the wiper/washer system 104 includes a rear washer system 108 and a rear wiper system 110 for the rear windshield 102 that are both controlled simultaneously by the control system 106 (and based on a user's engagement of a single user interface 142, in one embodiment), as forth in greater detail further below in connection with the discussion of FIGS. 2-5.

In one embodiment depicted in FIG. 1, the vehicle 100 includes, in addition to the above-referenced windshield, wiper/washer system 104, and control system 106, a chassis 112, a body 111, four wheels 116, an electronic system 118, a powertrain 120, a steering system 124, a braking system 126, and one or more other driver input systems 128. The body 111 is arranged on the chassis 112 and substantially encloses the other components of the vehicle 100. The body 111 and the chassis 112 may jointly form a frame. The wheels 116 are each rotationally coupled to the chassis 112 near a respective corner of the body 111. As depicted in FIG. 1, each wheel 116 comprises a wheel assembly that includes a tire as well as a wheel and related components (and that are collectively referred to as the "wheel 116" for the purposes of this Application). In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the powertrain 120 includes an actuator assembly that includes an engine 122. In various other embodiments, the powertrain 120 may vary from that depicted in FIG. 1 and/or described below (e.g. in some embodiments the powertrain may include a gas combustion engine 122, while in other embodiments the powertrain 120 may include an electric motor, alone or in combination with one or more other powertrain components, for example for electric vehicles, hybrid vehicles, and the like). In one embodiment depicted in FIG. 1, the actuator assembly and the powertrain 120 are mounted on the chassis 112 that drives the wheels 116. In one embodiment, the engine 122 comprises a combustion engine. In various other embodiments, the engine 122 may comprise one or more other types of engines and/or motors, such as an electric motor/generator, instead of or in addition to the combustion engine. In certain embodiments, the electronic system 118 comprises an engine system that controls the engine 122 and/or one or more other systems of the vehicle 100.

Still referring to FIG. 1, in one embodiment, the engine 122 is coupled to at least some of the wheels 116 through one or more drive shafts 114. In some embodiments, the engine 122 is mechanically coupled to the transmission. In other embodiments, the engine 122 may instead be coupled to a generator used to power an electric motor that is mechanically coupled to the transmission. In certain other embodiments (e.g. electrical vehicles), an engine and/or transmission may not be necessary.

The steering system 124 is mounted on the chassis 112, and controls steering of the wheels 116. In one embodiment, the steering system may include a non-depicted steering wheel and a steering column. In various embodiments, the steering wheel receives inputs from a driver of the vehicle 100, and the steering column results in desired steering angles for the wheels 116 via the drive shafts 114 based on the inputs from the driver. In certain embodiments, an autonomous vehicle may utilize steering commands that are generated by a computer, with no involvement from the driver.

The braking system 126 is mounted on the chassis 112, and provides braking for the vehicle 100. The braking system 126 receives inputs from the driver via a non-depicted brake pedal, and provides appropriate braking via brake units (not depicted).

Other driver input systems 128 may include an acceleration input system comprising an accelerator pedal that is engaged by a driver, with the engagement representative of a desired speed or acceleration of the vehicle 100. The other driver input systems 128 may also include, among other possible systems, various other inputs for various vehicle devices and/or systems, such as for an infotainment system and/or one or more environmental systems, lighting units, and the like (not depicted). Similar to the discussion above regarding possible variations for the vehicle 100, in certain embodiments steering, braking, suspension, acceleration, and/or other driving features can be commanded by a computer instead of by a driver.

As depicted in FIG. 1 and referenced above, the wiper/washer system 104 includes the above-referenced rear washer system 108 and rear wiper system 110. For ease of illustrations, the wiper/washer system 104 is also depicted in FIG. 2 with respect to the rear windshield and the control system 106 in accordance with one exemplary embodiment.

With reference to both FIG. 1 and FIG. 2, in one embodiment the rear washer system 108 includes a pump 130, a nozzle 131, and a reservoir 132. The reservoir 132 holds washer fluid. The pump 130 supplies the washer fluid from the reservoir 132 to the nozzle 131 based on a user's engagement of the user interface 142. The nozzle 131 sprays the washer fluid onto a surface of the rear windshield 102 based on the user's engagement of the user interface 142. In one embodiment, a controller 150 of the control system 106 (e.g. a processor 152 thereof, as depicted in FIG. 1) controls operation of the pump 130 and the nozzle 131 by providing instructions to the pump 130 and to the nozzle 131, that are based on the user's engagement of the user interface 142.

With further reference to both FIG. 1 and FIG. 2, in one embodiment the rear wiper system 110 includes one or more wiper blades 134 and actuators 136. The one or more wiper blades 134 move in one or more directions 204 along a surface of the rear windshield 102. The movement of the one or more blades 134 is controlled via the one or more actuators 136. In one embodiment, a controller 150 of the control system 106 (e.g. a processor 152 thereof, as depicted in FIG. 1) controls operation of the actuators 136 via instructions provided to the actuators 136 for controlling the blades 134 that are based on the user's engagement of the user interface 142.

In one embodiment, the control system 106 is mounted on the chassis 112. As discussed above, the control system 106 provides simultaneous control of the rear washer system 108 and the rear wiper system 110 for the rear windshield 102, as set forth in greater detail in connection with the discussion of FIGS. 2-5.

As depicted in FIG. 1, in one embodiment the control system 106 comprises the above-referenced user interface 142 and controller 150, in addition to one or more detection units 144 and a display system 151. While the components of the control system 106 (including the user interface 142, the detection units 144, the controller 150, and the display system 151) are depicted as being part of the same system, it will be appreciated that in certain embodiments these features may comprise two or more systems. In addition, in various embodiments the control system 106 may comprise all or part of, and/or may be coupled to, various other vehicle devices and systems, such as, among others, the wiper/washer system 104, the actuator assembly, the electronic system 118, and/or one or more other systems of the vehicle 100.

The user interface 142 receives user inputs from a user of the vehicle 100 (e.g. a driver of the vehicle 100) for controlling the wiper/washer system 104. In various embodiments, the user interface 142 comprises a single device for the user to engage with to control both the rear washer system 108 and the rear wiper system 110. In one embodiment, the user interface comprises a single button, a single switch, or similar device for receiving user inputs for operation and control of the rear washer system 108 and the rear wiper system 110. Also in one embodiment, the one or more detection units 144 read, detect and/or measure one or more features of the user interface 142, such as the activation time, engagement and/or operation of the interface 142 (e.g. including how long the user has engaged the user interface 142 and/or an activation time for a switch and/or other component of the user interface 142). In certain embodiments, the detection units 144 may be coupled to the user interface 142. In certain embodiments, the detection units 144 may be part of the user interface 142. In certain embodiments, the detection units 144 may be part of and/or coupled to a control unit, such as the control system 106, the electronic system 118, another electronic control unit, and/or one or more other systems. In certain embodiments, the detection units 144 comprise one or more input pins or circuits. In other embodiments, the detection units 144 may comprise one or more sensors, among other possible variations.

With reference to FIGS. 3 and 4, two examples are provided for the appearance of the user interface 142 of FIGS. 1 and 2, in accordance with exemplary embodiments. Specifically, FIG. 3 depicts a first exemplary user interface 300, and FIG. 4 depicts a second exemplary user interface 400, in accordance with exemplary embodiments. In exemplary embodiments, both the first and second exemplary user interfaces 400 comprise buttons or switches that are engaged by the user (with such engagement measured via corresponding detection units 144 of FIG. 1).

As depicted in FIG. 3, the first exemplary user interface 300 comprises a single device (e.g. a single button or switch) that includes a first image 302 and a second image 304, along with a first description 306 and a second description 308. The first image 302 shows a wiper blade (e.g. corresponding to blade 134 of FIGS. 1 and 2), and the second image 304 shows a similar wiper blade along with the spraying of washer fluid (e.g. corresponding to spraying via the nozzle 131 of FIGS. 1 and 2). The first description 306 includes one or more words (e.g. the word "press"), and the second description 308 includes one or more different words (e.g. the word "hold"). It will be appreciated that the exact images and/or descriptions may vary in certain embodiments. In certain embodiments, various embodiments each of the images 302, 304 and descriptions 306, 308 all appear on the same device (e.g. on the same button or switch). However, this may vary in other embodiments. Applicant notes that the images of two different switches is for illustrative purposes only, and that the number, type, and/or design of switches and/or other devices may vary in different embodiments.

As depicted in FIG. 4, the second exemplary user interface 400 comprises a single device (e.g. a single button or switch) that includes a first image 402 and a second image 404, along with a first description 406 and a second description 408. The first image 402 shows a wiper blade (e.g. corresponding to blade 134 of FIGS. 1 and 2), and the second image 404 shows the spraying of washer fluid (e.g. corresponding to spraying via the nozzle 131 of FIGS. 1 and 2). The first description 406 includes one or more words (e.g. the word "press"), and the second description 408 includes one or more different words (e.g. the word "hold"). It will be appreciated that the exact images and/or descriptions may vary in certain embodiments. In certain embodiments each of the images 402, 404 and descriptions 406, 408 all appear on the same device (e.g. on the same button or switch). However, this may vary in other embodiments. Applicant notes that the images of two different switches is for illustrative purposes only, and that the number, type, and/or design of switches and/or other devices may vary in different embodiments.

Returning to FIG. 1, the control system 106 is coupled to the user interface 142, the detection units 144, and the display system 151. The control system 106 utilizes the various measurements and information from the detection units 144 (and/or from the user interface 142), and automatically controls the rear washer system 108 and the rear wiper system 110 based on the measured engagement of the user interface 142 by the user, for example in accordance with the steps discussed further below in connection with the process 500 of FIG. 5. In certain embodiments the control system 106 controls the rear washer system 108 and the rear wiper system 110 simultaneously in this manner; however, this may vary in other embodiments.

As depicted in FIG. 1, the control system 106 comprises a computer system. In certain embodiments, the control system 106 may also include one or more of the user interface 142, one or more of the detection units 144, one or more other devices and/or systems, and/or components thereof. In addition, it will be appreciated that the control system 106 may otherwise differ from the embodiment depicted in FIG. 1. For example, the control system 106 may be coupled to or may otherwise utilize one or more remote computer systems and/or other systems, such as the electronic system 118 and/or one or more other systems of the vehicle 100.

In the depicted embodiment, the computer system of the control system 106 includes a processor 152, a memory 154, an interface 156, a storage device 158, and a bus 160. The processor 152 performs the computation and control functions of the control system 106, and may comprise any type of processor or multiple processors, single integrated circuits such as a microprocessor, or any suitable number of integrated circuit devices and/or circuit boards working in cooperation to accomplish the functions of a processing unit. During operation, the processor 152 executes one or more programs 162 contained within the memory 154 and, as such, controls the general operation of the control system 106 and the computer system of the control system 106, generally in executing the processes described herein, such as the process 200 described further below in connection with FIGS. 2-5.

The memory 154 can be any type of suitable memory. For example, the memory 154 may include various types of dynamic random access memory (DRAM) such as SDRAM, the various types of static RAM (SRAM), and the various types of non-volatile memory (PROM, EPROM, and flash). In certain examples, the memory 154 is located on and/or co-located on the same computer chip as the processor 152. In the depicted embodiment, the memory 154 stores the above-referenced program 162 along with one or more stored values 184.

The bus 160 serves to transmit programs, data, status and other information or signals between the various components of the computer system of the control system 106. The interface 156 allows communication to the computer system of the control system 106, for example from a system driver and/or another computer system, and can be implemented using any suitable method and apparatus. In one embodiment, the interface 156 obtains the various data from the detection units 144. The interface 156 can include one or more network interfaces to communicate with other systems or components. The interface 156 may also include one or more network interfaces to communicate with technicians, and/or one or more storage interfaces to connect to storage apparatuses, such as the storage device 158.

The storage device 158 can be any suitable type of storage apparatus, including direct access storage devices such as hard disk drives, flash systems, floppy disk drives and optical disk drives. In one exemplary embodiment, the storage device 158 comprises a program product from which memory 154 can receive a program 162 that executes one or more embodiments of one or more processes of the present disclosure, such as the steps of the process 200 (and any sub-processes thereof) described further below in connection with FIGS. 2-5. In another exemplary embodiment, the program product may be directly stored in and/or otherwise accessed by the memory 154 and/or a disk (e.g., disk 186), such as that referenced below.

The bus 160 can be any suitable physical or logical means of connecting computer systems and components. This includes, but is not limited to, direct hard-wired connections, fiber optics, infrared and wireless bus technologies. During operation, the program 162 is stored in the memory 154 and executed by the processor 152.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 152) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the control system 106 may also otherwise differ from the embodiment depicted in FIG. 1, for example in that the computer system of the control system 106 may be coupled to or may otherwise utilize one or more remote computer systems and/or other systems.

The display system 151 is coupled to the control system 106, and provides a notification (e.g. a display) of the operation of the wiper/washer system 104. In one embodiment, the display system 151 comprises a display screen that provides a visual indication that the wiper/washer system 104 when the wiper/washer system 104 is operating. In certain embodiments, the display system 151 provides a single indication for operation of the wiper/washer system 104. In certain other embodiments, the display system 151 provides separate indications for operation of the rear washer system 108 and the rear wiper system 110. In various embodiments, the display system 151 is controlled via instructions provided thereto by the processor 152 of FIG. 1. In certain embodiments, this may vary. For example, in certain embodiments, the display may simply comprise an indicator placed on the switch itself, among other possible variations. For example, in certain embodiments, an Indicator Status flag may be used to turn on an Indicator LED/Lamp on the Switch and/or other type of display system 151, among other possible variations. In one embodiment, a notification (e.g. display) is provided while the rear wiper unit is active or in a drip mode preceded by an active state, via instructions provided by the processor 132.

Figure 5:
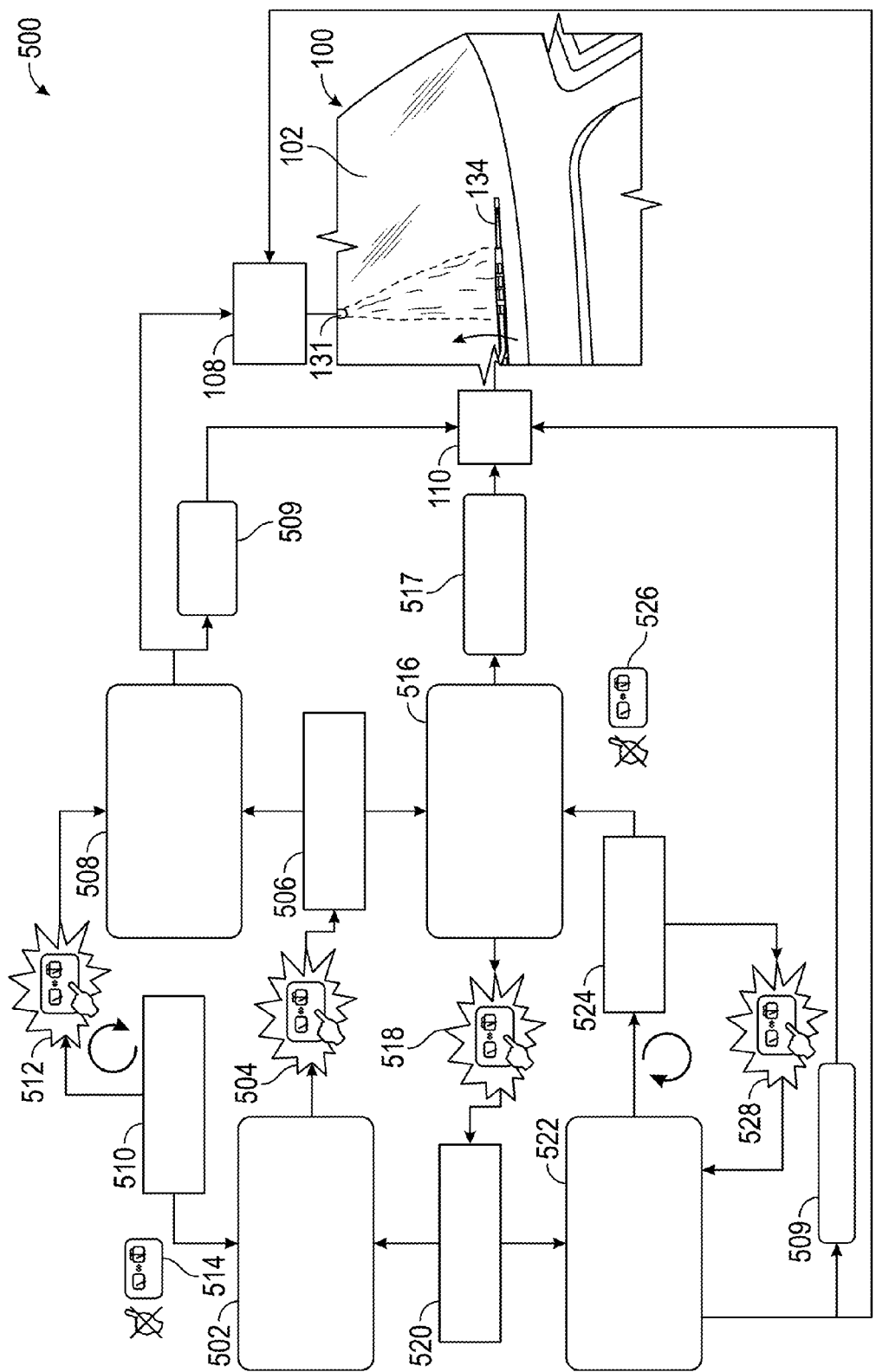
FIG. 5 is a flowchart of a process for controlling rear windshield washer and wiper units of a vehicle, and that can be implemented in connection with the vehicle of FIG. 1, and the rear windshield, the rear windshield washer unit, the rear windshield wiper unit, the user interface, and the control system of FIGS. 1-4, in accordance with an exemplary embodiment.

FIG. 5 is a flowchart of a process 500 for controlling rear windshield washer and wiper units of a vehicle, in accordance with an exemplary embodiment. The process 500 can be implemented in connection with the vehicle 100 of FIG. 1, the rear windshield 102 of FIGS. 1 and 2, the rear washer system 108 of FIGS. 1 and 2, the rear wiper system 110 of FIGS. 1 and 2, and the control system 106 and user interface 142 of FIGS. 1-4, in accordance with exemplary embodiments.

As depicted in FIG. 5, the process 500 begins at step 502. During step 502, the rear wiper/washer system is in an initial state, in which (i) the rear washer system is inactive (e.g. no fluid is being sprayed), (ii) the rear wiper system is inactive (e.g. the wiper blade is not moving), and (iii) the display system is inactive (e.g. there is no indication that the wiper/washer system is operating).

Reading, detection, and/or monitoring is performed of a user's engagement of a user interface for the wiper/washer system (step 504). In one embodiment, the detection units 144 of FIG. 1 read, detect, and/or monitor an activation time, and/or a user's engagement of, one or more buttons, switches, and/or other device (e.g. as depicted in FIG. 3 or 4) associated with the user interface 142; however, this may vary in other embodiments. Also in one embodiment, the processor 152 of FIG. 1 assists with such reading, detecting, and/or monitoring.

A determination is made as to a duration of time for which the user has engaged the user interface (step 506). In one embodiment, this determination is made by the processor 152 of FIG. 1 using data from the detection units 144 of FIG. 1, with respect to a current engagement of the single device that comprises the user interface 142 of FIG. 1 (e.g. a single switch or button of FIG. 3 or 4). Also in one embodiment, the determination pertains to a current, continuous engagement of the user interface. In one embodiment, the determination pertains to whether such current, continuous engagement of the user interface is greater than one or more predetermined thresholds. In one embodiment, the determination comprises a determination as to whether the engagement exceeds a single predetermined threshold, e.g. "x" seconds (this may be approximately equal to one second in one embodiment, or one or more other values in other embodiments). In yet other embodiments, multiple thresholds may be used. For example, in one embodiment, up to three time thresholds (x, y z) (or more) may be utilized. In one embodiment, "x" may represent the activations that fall under the short press criteria (in our example, x=50 ms) (e.g. "x" may comprise a "predetermined short press threshold"), "y" may represent the ones under long press (in our example, y=1 s) (e.g. "y" may comprise a "predetermined long press threshold"), and "z" may stand for the failure detection (e.g. stuck switch after 60 seconds of steady activation) (e.g. "z" may comprise a "predetermined fault threshold"), among other possible variations. The number, types, and/or values of the thresholds may vary in various embodiments. Similar to the examples noted above, in certain embodiments the predetermined long press threshold is greater than the predetermined short press threshold, and the predetermined fault threshold is greater than the predetermined long press threshold.

If it is determined in step 506 that the user engagement of the user interface is greater than the predetermined threshold of step 506 (e.g. representing a relatively long press and hold of the user interface), then the process proceeds to step 508. During step 508, the rear washer system is activated and the rear wiper system is placed in a drip mode. In one embodiment, the rear washer system 108 of FIG. 1 sprays washer fluid on the rear windshield 102 of FIG. 1 via one or more nozzles 131 of FIG. 1 based on instructions provided via the processor 152 of FIG. 1. Also in one embodiment, the blade 134 of the rear wiper system 110 of FIG. 1 is activated via an actuator, and moves along the rear windshield 102 based on instructions provided by the processor 152 of FIG. 1. In one embodiment, the rear wiper system 110 is operated using a "drip mode" 509, for example including a slight delay (e.g. one second) from the spraying of the fluid via the nozzle to the movement of the wiper blade. In addition, in one embodiment, the display system 151 of FIG. 1 is inactive during step 508 (e.g. there are no instructions via the processor 152 of FIG. 1 to provide an indication of operation of the wiper/washer system 104 in one embodiment, because the user would be deemed to be aware of this via the spraying of the fluid onto the rear windshield). In other embodiments, this may vary. For example, in certain embodiments, information may be provided to the customer (e.g. on a Cluster or infotainment screen), for example for gamification, informational, and/or other purposes.

While step 508 is ongoing, the user's engagement of the user interface continues to be monitored (step 510). In various embodiments, the monitoring is performed via the detection units 144 of FIG. 1, with assistance of the processor 152 of FIG. 1 in certain embodiments, similar to as in step 504. If it is determined (e.g. by the processor using data provided by the detection units) that the user continues to be engaging the user interface (e.g. the single button or switch) in a continuous manner (step 512), then step 508 continues so long as the user continues to engage the user interface.

Once it is determined (e.g. by the processor using data provided by the detection units) that the user's engagement of the user interface has ended (e.g., the user is no longer holding the single button or switch) (step 514), then the process returns to step 502. Specifically, the rear washer system and the rear wiper system are both deactivated. In one embodiment, the rear washer system 108 of FIG. 1 no longer sprays washer fluid on the rear windshield 102 of FIG. 1, and the blade 134 of the rear wiper system 110 of FIG. 1 no longer moves along the is activated via an actuator, based on instructions provided by the processor 152 of FIG. 1. Also in one embodiment, the display system 151 of FIG. 1 is inactive.

Returning to step 506, if it is determined in step 506 that the user engagement of the user interface is less than or equal to one or more predetermined thresholds of step 506 representing a relatively short press of the user interface (e.g. 50 milliseconds in one embodiment; however, the number, types, and/or values of such thresholds may vary in other embodiments), then the process proceeds to step 516. During step 516, the rear washer system remains inactive, and the rear wiper system is activated. In one embodiment, the rear washer system 108 of FIG. 1 does not spray washer fluid on the rear windshield 102 of FIG. 1. Also in one embodiment, the blade 134 of the rear wiper system 110 of FIG. 1 is activated via an actuator, and moves along the rear windshield 102 based on instructions provided by the processor 152 of FIG. 1. Also in one embodiment, the rear wiper system 110 is operated using an "active mode" 517, in which the blade 134 is operating in one or more calibratable manners (e.g. as when it is raining outside), such as, by way of example, that includes one or more different rear wiper activation behaviors such as fixed intermittency rear wiper activation, variable intermittency rear wiper activation, constant speed rear wiper activation, and the like. In addition, in one embodiment, the display system 151 of FIG. 1 is activated during step 516 (e.g. instructions are provided via the processor 152 of FIG. 1 for the display system 151 to provide a visual indication that the wiper/washer system 104 is operating, in one embodiment).

Step 516 continues until a detection is made (step 518) that the user has re-engaged the user interface. In one embodiment, this detection is made by the detection units 144 of FIG. 1. In addition, once the re-engagement of the user interface is detected, the re-engagement of the user interface continues to be monitored in step 518 (similar to step 504), and a determination is made as to a duration of time for which the user has re-engaged the user interface (step 520). Similar to the discussion above, in one embodiment, this determination is made by the processor 152 of FIG. 1 using data from the detection units 144 of FIG. 1, with respect to a current engagement of the user interface. Also in one embodiment, the determination pertains to a current, continuous re-engagement of the user interface. In one embodiment, the determination pertains to whether such current, continuous engagement of the user interface is greater than one or more predetermined thresholds. In one embodiment, the determination comprises a determination as to whether the engagement exceeds a single predetermined threshold, e.g. "x" seconds (this may be approximately equal to one second in one embodiment, or one or more other values in other embodiments). In yet other embodiments, multiple thresholds may be used. For example, in one embodiment, up to three time thresholds (x, y z) (or more) may be utilized. In one embodiment, "x" may represent the activations that fall under the short press criteria (in our example, x=50 ms), "y" may represent the ones under long press (in our example, y=1 s), and "z" may stand for the failure detection (e.g. stuck switch after 60 seconds of steady activation), among other possible variations. In certain embodiments, the predetermined thresholds of step 520 are equal to the threshold of step 506; however, this may vary in other embodiments. The number, types, and/or values of the thresholds may vary in various embodiments.

If it is determined in step 520 that the user engagement of the user interface is less than or equal to one or more of the predetermined thresholds of step 520 (e.g. representing a relatively short press of the user interface), then the process proceeds to the above-referenced step 502, in which each of the rear washer system, rear wiper system, and display system are inactive. Specifically, in one embodiment, the rear washer system remains inactive in this iteration of step 502, while the rear wiper system and the display system are de-activated (e.g. the wiper blade movement of the rear wiper system ends, and the visual indication of the display system ends, based on instructions provided by the processor, in one embodiment).

Conversely, if it is determined in step 520 that the user engagement of the user interface is greater than one or more of the predetermined thresholds of step 520 (e.g. representing a relatively long hold of the user interface), then the process proceeds instead to step 522. During step 522, the rear washer system is activated, the rear wiper system remains activated (but in a different mode, in one embodiment), and the display system remains indicating that the rear wiper is in an active state. In one embodiment, the rear washer system 108 of FIG. 1 sprays washer fluid on the rear windshield 102 of FIG. 1 via one or more nozzles 131 of FIG. 1 based on instructions provided via the processor 152 of FIG. 1. Also in one embodiment, the blade 134 of the rear wiper system 110 of FIG. 1 remains activated, but instead moves in accordance with the "drip" mode 509 of step 508, based on instructions provided by the processor 152 of FIG. 1. Also in one embodiment, the display system 151 of FIG. 1 remains active during step 522, based on instructions provided by the processor 152 of FIG. 1.

While step 522 is ongoing, the user's engagement of the user interface continues to be monitored (step 524). In various embodiments, the monitoring is performed via the detection units 144 of FIG. 1, with assistance of the processor 152 of FIG. 1 in certain embodiments, similar to as in steps 504 and 510. If it is determined (e.g. by the processor using data provided by the detection units) that the user continues to be engaging the user interface (e.g. the button or switch) in a continuous manner (step 528), then step 522 continues so long as the user continues to engage the user interface.

Once it is determined (e.g. by the processor using data provided by the detection units) that the user's engagement of the user interface has ended (e.g., the user is no longer holding the button or switch) (step 526), then the process returns to the above-referenced step 516. Specifically, in one embodiment, the rear washer system is deactivated (so that fluid no longer is sprayed on the rear windshield), based on instructions provided by the processor. Also in one embodiment, rear wiper system remains activated, and returns to active mode of step 516, based on instructions provided by the processor. In addition, in one embodiment, the display system 151 remains activated, and continues to provide a visual indication that the wiper/washer system is operating, based on instructions provided by the processor.

Therefore, among other features of the process 500 as depicted in FIG. 5 and described above, the rear washer system and the rear wiper system are automatically and simultaneously controlled together based on a user's engagement of a single user input device (e.g. a single button or switch). Also per the discussion above and also as depicted in FIG. 5, the user's selective engagement of the single user input device via short presses versus long holds, and the ending and re-initiating of such engagement of the user input device, is used by the processor as criteria for implementing the automatic control of the rear washer system and the rear wiper system. In addition, in one embodiment, (i) if the duration of the engagement is greater than a predetermined fault threshold, then a fail-soft strategy is employed (e.g. by disabling the rear washer unit while continuing operation of the rear wiper unit in an active mode); (ii) else if the duration of the engagement is greater than a predetermined long press threshold and less than the predetermined fault threshold, the rear wiper unit is activated in a drip wipe mode and the rear washer unit is activated; (iii) else if the duration of the engagement is greater than a predetermined short press threshold and less than the predetermined long press threshold, the rear wiper unit is activated in an active wiper mode.

Accordingly, methods, systems, and vehicles are provided for providing control of rear washer an rear wiper systems of a vehicle. In various embodiments, determinations are made as to a user's engagement of a single user interface device (such as a single button or switch), for use in automatically controlling the rear washer and rear wiper system simultaneously with one another.

It will be appreciated that the disclosed methods, systems, and vehicles may vary from those depicted in the Figures and described herein. For example, the vehicle 100, the control system 106, the rear washer system 108, the rear wiper system 110, the user interface 142, and/or various components thereof may vary from that depicted in FIGS. 1-4 and described in connection therewith. It will similarly be appreciated that certain steps of the process 500 may vary from those depicted in FIG. 5 and/or described above in connection therewith. It will similarly be appreciated that certain steps of the methods described above may occur simultaneously or in a different order than that depicted in FIG. 5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   detecting, via a detection unit comprising a sensor disposed onboard a vehicle having a rear windshield, a user's engagement of a single input device onboard the vehicle, wherein the step of detecting the user's engagement of the single input device comprises measuring a first duration of engagement of the single input device by the user; and
   automatically controlling a rear wiper unit for the rear windshield and a rear washer unit for the rear windshield, via a processor, based on the detecting of the user's engagement of the single input device;
   wherein the step of automatically controlling the rear wiper unit for the rear windshield and the rear washer unit for the rear windshield comprises:
      when the first duration of the user's engagement of the single input device is greater than a predetermined threshold amount of time, then:
         activating the rear washer unit and maintaining the rear wiper unit in a drip mode, so long at the user remains engaging the single input device; and
         turning off the rear wiper unit and the rear washer unit, when the user stops engaging the single input device following the first duration; and
      when the first duration of the user's engagement of the single input device is less than the predetermined threshold amount of time, then:
         activating the rear wiper unit but not the rear washer unit and maintaining the rear wiper unit activated; and
         when the user next engages the single input device again for a second duration of engagement following the first duration of engagement, then:
            turning off the rear wiper unit, and maintaining the rear washer unit off, when the second duration is less than the predetermined threshold; and
            changing the rear wiper unit to the drip mode, and activating the rear washer unit, when the second duration is greater than the predetermined threshold; wherein when the rear wiper unit is in the drip mode, there is a delay from a spraying of fluid by the rear washer unit to movement of the rear wiper unit.

2. The method of claim 1, wherein
   the single input device comprises a single button onboard the vehicle; and the method comprises:
      detecting, via the sensor, the user's engagement of the single button; and
      automatically controlling the rear wiper unit and the rear washer unit based on the detecting of the user's engagement of the single button.

3. The method of claim 1, further comprising:
   providing a visual notification on a display screen while the rear wiper unit is active or in a drip mode preceded by an active state.

4. The method of claim 1, wherein the step of automatically controlling the rear wiper unit and the rear washer unit comprises:
   when the first duration of the engagement is greater than a predetermined fault threshold, then placing the rear washer unit, the rear wiper unit, or both, in a failsoft mode.

5. The method of claim 4, wherein the step of placing the rear washer unit, the rear wiper unit, or both in a failsoft mode comprises disabling the rear washer unit and disabling the rear wiper unit.

6. The method of claim 4, wherein the step of automatically controlling the rear wiper unit and the rear washer unit further comprises:
   when the first duration of the engagement is greater than a predetermined long press threshold and less than the predetermined fault threshold, wherein the predetermined fault threshold is greater than the predetermined long press threshold, then activating the rear wiper unit in a drip wipe mode and activating the rear washer unit.

7. The method of claim 6, wherein the step of automatically controlling the rear wiper unit and the rear washer unit further comprises:
   when the first duration of the engagement is greater than a predetermined short press threshold and less than the predetermined long press threshold, wherein the predetermined short press threshold is less than the predetermined long press threshold, then activating the rear wiper unit in an active wiper mode.

8. The method of claim 7, further comprising:
   calibrating one or more calibratable parameters for the active wiper mode, for a particular driver of the vehicle;
   implementing the active wiper mode using the one or more calibratable parameters for the driver of the vehicle.

9. The method of claim 7, wherein the calibrable parameters include one or more of the following: a fixed intermittency, a variable intermittency, and a constant speed for the rear wiper unit.

10. The method of claim 1, wherein the step of placing the rear washer unit, the rear wiper unit, or both in a failsoft mode comprises disabling the rear washer unit while continuing operation of the rear wiper unit.

11. The method of claim 1, wherein the step of automatically controlling the rear wiper unit and the rear washer unit comprises:
   when the rear washer unit is active and the single input device is released by the user, then deactivating the rear washer unit.

12. The method of claim 1, wherein the steps of detecting the user's engagement of the single input device and automatically controlling the rear wiper unit for the rear windshield and the rear washer unit for the rear windshield based on the detecting of the user's engagement of the single input device are each performed as the vehicle is driven by a driver of the vehicle.

13. The method of claim 12, wherein the steps of detecting the user's engagement of the single input device and automatically controlling the rear wiper unit for the rear windshield and the rear washer unit for the rear windshield based on the detecting of the user's engagement of the single input device are each performed as the vehicle is driven by a driver of the vehicle under conditions rather than an end of line production testing of associated components.

14. A system comprising:
   a detection unit comprising a sensor coupled to a single input device onboard a vehicle having a rear windshield, a rear washer unit for the rear windshield, and a rear wiper unit for the rear windshield, the detection unit configured to detect a user's engagement of the single input device, wherein the sensor is configured to measure a first duration of engagement of the single input device by the user; and
   a processor coupled to the detection unit, the processor configured to at least facilitate automatically controlling the rear wiper unit and the rear washer unit based on the detecting of the user's engagement of the single input device, wherein the processor is configured to control the rear wiper unit and the rear washer unit at least in part by:
      when the first duration of the user's engagement of the single input device is greater than a predetermined threshold amount of time, then:
         activating the rear washer unit and maintaining the rear wiper unit in a drip mode, so long at the user remains engaging the single input device; and
         turning off the rear wiper unit and the rear washer unit, when the user stops engaging the single input device following the first duration; and
      when the first duration of the user's engagement of the single input device is less than the predetermined threshold amount of time, then:
         activating the rear wiper unit but not the rear washer unit and maintaining the rear wiper unit activated; and
         when the user next engages the single input device again for a second duration of engagement following the first duration of engagement, then:
            turning off the rear wiper unit, and maintaining the rear washer unit off, when the second duration is less than the predetermined threshold; and
            changing the rear wiper unit to the drip mode, and activating the rear washer unit, when the second duration is greater than the predetermined threshold; wherein when the rear wiper unit is in the drip mode, there is a delay from a spraying of fluid by the rear washer unit to movement of the rear wiper unit.

15. The system of claim 14, wherein
   the single input device comprises a single button onboard the vehicle;
   the sensor is configured to detect the user's engagement of the single button; and
   the processor is configured to at least facilitate controlling the rear wiper unit and the rear washer unit based on the detecting of the user's engagement of the single button.

16. The system of claim 14, further comprising:
   a notification unit including a display screen;
   wherein the processor is configured to at least facilitate providing, via the notification unit, a visual notification on a display screen while the rear wiper unit is active or in a drip mode preceded by an active state.

17. The system of claim 14, wherein the processor is configured to at least facilitate:
   when the first duration of the engagement is greater than a predetermined fault threshold, placing the rear washer unit, the rear wiper unit, or both, in a failsoft mode.

18. A vehicle comprising:
   a rear windshield;
   a rear washer unit for the rear windshield;
   a rear wiper unit for the rear windshield; and
   a control system comprising:
      a detection unit comprising a sensor coupled to a single input device onboard the vehicle, the detection unit configured to detect a user's engagement of the single input device, wherein the sensor is configured to measure a first duration of engagement of the single input device by the user; and a processor coupled to the detection unit, the processor configured to at least facilitate automatically controlling the rear wiper unit and the rear washer unit based on the detecting of the user's engagement of the single input device, wherein the processor is configured to control the rear wiper unit and the rear washer unit at least in part by:

when the first duration of the user's engagement of the single input device is greater than a predetermined threshold amount of time, then:
  activating the rear washer unit and maintaining the rear wiper unit in a drip mode, so long at the user remains engaging the single input device; and
  turning off the rear wiper unit and the rear washer unit, when the user stops engaging the single input device following the first duration; and when the first duration of the user's engagement of the single input device is less than the predetermined threshold amount of time, then:
  activating the rear wiper unit but not the rear washer unit and maintaining the rear wiper unit activated; and
  when the user next engages the single input device again for a second duration of engagement following the first duration of engagement, then:
    turning off the rear wiper unit, and maintaining the rear washer unit off, when the second duration is less than the predetermined threshold; and
    changing the rear wiper unit to the drip mode, and activating the rear washer unit, when the second duration is greater than the predetermined threshold; wherein when the rear wiper unit is in the drip mode, there is a delay from a spraying of fluid by the rear washer unit to movement of the rear wiper unit.

19. The vehicle of claim 18, wherein:

the rear wiper unit comprises a blade and an actuator that causes movement of the blade across the rear windshield;

the rear washer unit comprises a nozzle that sprays fluid on the rear windshield, the nozzle coupled to a reservoir holding the fluid and a pump that supplies the fluid;

the single input device comprises a single button onboard the vehicle;

the sensor is configured to detect the user's engagement of the single button; and the processor is configured to at least facilitate controlling the rear wiper unit and the rear washer unit, at least in part by controlling operation of the actuator and the pump, respectively, based at least in part on the detecting of the user's engagement of the single button.

* * * * *